(12) United States Patent
Heo et al.

(10) Patent No.: US 12,270,694 B2
(45) Date of Patent: Apr. 8, 2025

(54) SENSOR ASSEMBLY AND APPARATUS

(71) Applicant: HL KLEMOVE CORP., Incheon (KR)

(72) Inventors: Hwan Heo, Incheon (KR); Jinseok Bae, Incheon (KR); Ilki Mun, Siheung (KR); Minyoung Lee, Incheon (KR); Jungwook Seo, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 117 days.

(21) Appl. No.: 18/335,292

(22) Filed: Jun. 15, 2023

(65) Prior Publication Data

US 2024/0003731 A1     Jan. 4, 2024

(30) Foreign Application Priority Data

Jun. 30, 2022   (KR) ........................ 10-2022-0080756
Feb. 3, 2023   (KR) ........................ 10-2023-0014745

(51) Int. Cl.
    *G01F 23/24*      (2006.01)
    *B62D 5/04*       (2006.01)
    *B62D 15/02*     (2006.01)

(52) U.S. Cl.
    CPC ......... *G01F 23/242* (2013.01); *B62D 5/0481* (2013.01); *B62D 5/0406* (2013.01); *B62D 15/0225* (2013.01)

(58) Field of Classification Search
None
See application file for complete search history.

(56) References Cited

U.S. PATENT DOCUMENTS

| | | | |
|---|---|---|---|
| 9,109,938 B2 | 8/2015 | Molinaro | |
| 10,046,791 B2 * | 8/2018 | Asakura | B62D 5/0448 |
| 2007/0115308 A1 * | 5/2007 | Hisano | B41J 2/17513 |
| | | | 347/7 |

FOREIGN PATENT DOCUMENTS

| | | | | |
|---|---|---|---|---|
| GB | 2444552 A | * | 6/2008 | ............ G01F 23/24 |
| JP | 5773005 B2 | | 9/2015 | |
| KR | 102325231 B1 | | 11/2021 | |
| WO | 2016111866 A1 | | 7/2016 | |

* cited by examiner

*Primary Examiner* — Justin N Olamit
(74) *Attorney, Agent, or Firm* — Harvest IP law, LLP

(57) ABSTRACT

Disclosed herein is a sensor assembly capable of detecting moisture introduced into a rack housing. The sensor assembly includes a housing, an angle sensor provided in the housing, and a moisture sensor provided in the housing. The moisture sensor includes a ground electrode, a first input electrode, a second input electrode, and a control unit electrically connected to the ground electrode, the first input electrode, and the second input electrode to detect moisture. The ground electrode, the first input electrode, and the second input electrode extend downward from the housing. A lower end of the ground electrode, a lower end of the first input electrode, and a lower end of the second input electrode are exposed to the outside of the housing. Further, the first input electrode extends downward to a different level compared to the second input electrode.

20 Claims, 9 Drawing Sheets

SENSOR ASSEMBLY AND APPARATUS

CROSS-REFERENCE TO RELATED APPLICATION

This application claims priority to Korean Patent Application No. 10-2022-0080756, filed on Jun. 30, 2022 and Korean Patent Application No. 10-2023-0014745, filed on Feb. 3, 2023, the disclosure of which is incorporated herein by reference in its entirety.

BACKGROUND

1. Field

The embodiments disclosed herein relate to an integrated sensor assembly, comprising: an angle sensor incorporated in a steering apparatus for vehicle wheel movement, and a moisture sensor designed to detect moisture infiltration within a package, and an apparatus including the same.

2. Description of the Related Art

In general, power steering is developed and applied in vehicle steering systems to aid drivers in handling the steering wheel, enhancing the driving experience. Various types exist, such as hydraulic steering using hydraulic pressure, electric hydraulic steering using both hydraulic pressure and an electromotive force of a motor, electric steering solely using the motor's electromotive force, etc.

Recently, steer-by-wire (SBW) steering apparatuses designed to steer a vehicle using a motor such as an electric motor have been developed and applied while mechanical connection devices such as a steering column, a universal joint, or a pinion shaft between a steering wheel and wheels are removed.

The SBW steering apparatus is an intelligent electrical signal steering mechanism that transmits a driver's steering intention into electrical signals. These signals then control vehicle's steering wheel and wheels, enabling the driver to steer the vehicle without mechanical connection between the steering wheel and the wheels.

The SBW steering apparatus includes a road wheel actuator (RWA) that transmits a driver's steering intention to the wheels of the vehicle to move the wheels, and a steering feedback actuator (SFA) that provides the driver with a reaction force of the steering wheel.

The RWA is provided with an angle sensor to track steering angles of the wheels. However, when moisture penetrates the RWA, it can potentially cause malfunctions in electronic devices such as the angle sensor or even render the RWA undrivable due to water damage. Thus, a technique for detecting water penetration is required to preemptively mitigate any risks that could affect the vehicle's operation.

SUMMARY

Therefore, it is an aspect of the present disclosure to provide an integrated sensor assembly, comprising: an angle sensor incorporated in a steering apparatus for vehicle wheel movement, and a moisture sensor designed to detect moisture infiltration within a package, and an apparatus including the same.

Additional aspects of the disclosure will be set forth in part in the description which follows and, in part, will be obvious from the description, or may be learned by practice of the disclosure.

In accordance with one aspect of the present disclosure, a sensor assembly includes a housing, an angle sensor provided in the housing, and a moisture sensor provided in the housing. The moisture sensor includes a ground electrode, a first input electrode, a second input electrode, and a control unit electrically connected to the ground electrode, the first input electrode, and the second input electrode to detect moisture. The ground electrode, the first input electrode, and the second input electrode extend downward from the housing. A lower end of the ground electrode, a lower end of the first input electrode, and a lower end of the second input electrode are exposed to the outside of the housing. Further, the first input electrode extends downward to a different level compared to the second input electrode.

The first input electrode extends further downward compared to the second input electrode.

The ground electrode extends downward to a same level as the first input electrode.

The control unit may detect a first input-electrode voltage between the ground electrode and the first input electrode, detect a second input-electrode voltage between the ground electrode and the second input electrode, and output a water level detection signal based on the first input-electrode voltage and the second input-electrode voltage.

The control unit may compare the first input-electrode voltage with a first reference voltage, and output a first water level detection signal.

The control unit may compare the second input-electrode voltage with a second reference voltage, and output a second water level detection signal.

The control unit may detect a first input-electrode current between the ground electrode and the first input electrode, detect a second input-electrode current between the ground electrode and the second input electrode, and output a water level detection signal based on the first input-electrode current and the second input-electrode current.

The moisture sensor may further include a third input electrode, and the third input electrode may extend downward from the housing, a lower end of the third input electrode may be exposed to the outside of the housing, and the first input electrode, the second input electrode, and the third input electrode extend downward to varying levels, distinct from one another.

The moisture sensor further comprises a third input electrode. Further, the first input electrode extends further downward compared to the second input electrode, and the second input electrode extends further downward compared to the third input electrode.

The moisture sensor may further include an electrode protection part which is configured to encompass sides of the ground electrode, the first input electrode, and the second input electrode, with an open lower end.

In accordance with another aspect of the present disclosure, an apparatus includes a pinion shaft coupled to a rack housing in which a rack bar is installed and provided with a pinion gear engaged with a rack gear, and a sensor assembly accommodated in the rack housing and coupled to the pinion shaft to detect a rotation angle of the pinion shaft. The sensor assembly includes a housing, an angle sensor provided in the housing, and a moisture sensor provided in the housing. The moisture sensor includes a ground electrode, a first input electrode, a second input electrode, and a control unit electrically connected to the ground electrode, the first input electrode, and the second input electrode to detect moisture. The ground electrode, the first input electrode, and the second input electrode extend downward from the housing, a lower end of the ground electrode, a lower end of the first input electrode. Further, a lower end of the second input electrode is exposed to the outside of the housing, and a height of the lower end of the first input electrode and a height of the lower end of the second input electrode, both measured from a bottom inner surface of a moisture storage tank of the rack housing, may be different from each other.

The height of the lower end of the first input electrode is lower than the height of the lower end of the second input electrode.

A height of the lower end of the ground electrode measured from the bottom inner surface of the moisture storage tank of the rack housing is equal to the height of the lower end of the first input electrode.

The control unit may detect a first input-electrode voltage between the ground electrode and the first input electrode, detect a second input-electrode voltage between the ground electrode and the second input electrode, and output a water level detection signal based on the first input-electrode voltage and the second input-electrode voltage.

The control unit may compare the first input-electrode voltage with a first reference voltage, and output a first water level detection signal.

The control unit may compare the second input-electrode voltage with a second reference voltage, and output a second water level detection signal.

The lower end of the ground electrode, the lower end of the first input electrode, and the lower end of the second input electrode may be arranged to be exposed in the water storage tank to collect moisture introduced into the rack housing.

In accordance with another aspect of the present disclosure, a moisture detecting method for a sensor assembly comprising a housing, a ground electrode, a first input electrode, and a second input electrode, wherein the ground electrode, the first input electrode, and the second input electrode extend downward from the housing and have lower ends exposed to the outside of the housing, the method includes detecting a first input-electrode voltage between the ground electrode and the first input electrode, detecting a second input-electrode voltage between the ground electrode and the second input electrode, and outputting a water level detection signal based on the first input-electrode voltage and the second input-electrode voltage.

The outputting of the water level detection signal may include outputting a first water level detection signal by comparing the first input-electrode voltage with a first reference voltage.

The outputting of the water level detection signal may include outputting a second water level detection signal by comparing the second input-electrode voltage with a second reference voltage.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
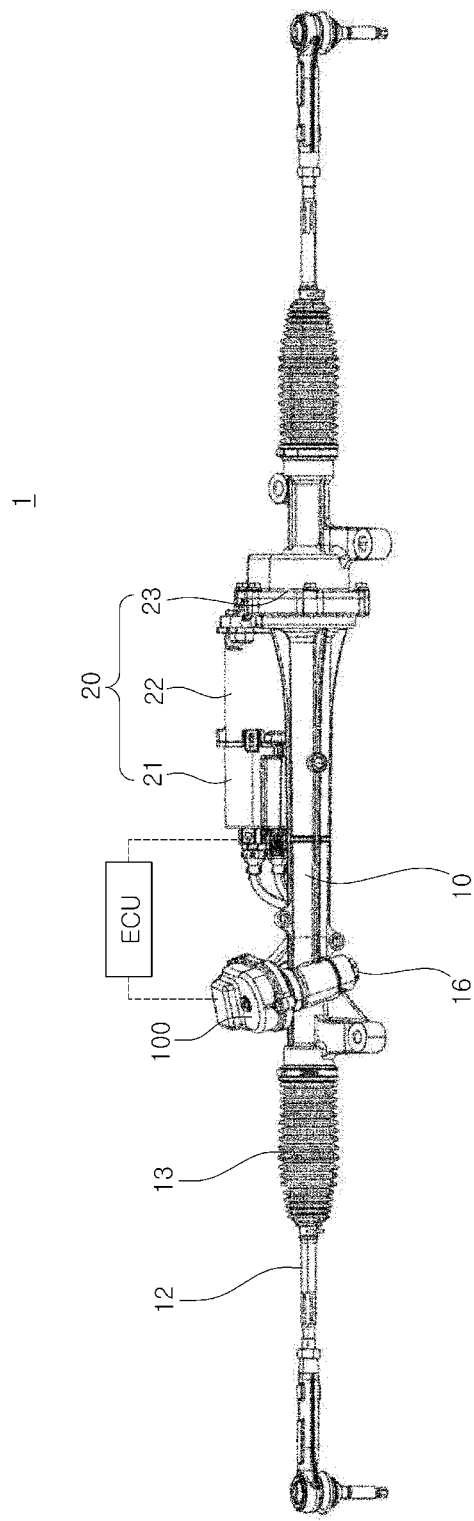
FIG. 1 is a perspective view of a steering apparatus of a vehicle.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the embodiments of the present disclosure, examples of which are illustrated in the accompanying drawings, wherein like reference numerals refer to like elements throughout.

Figure 3:
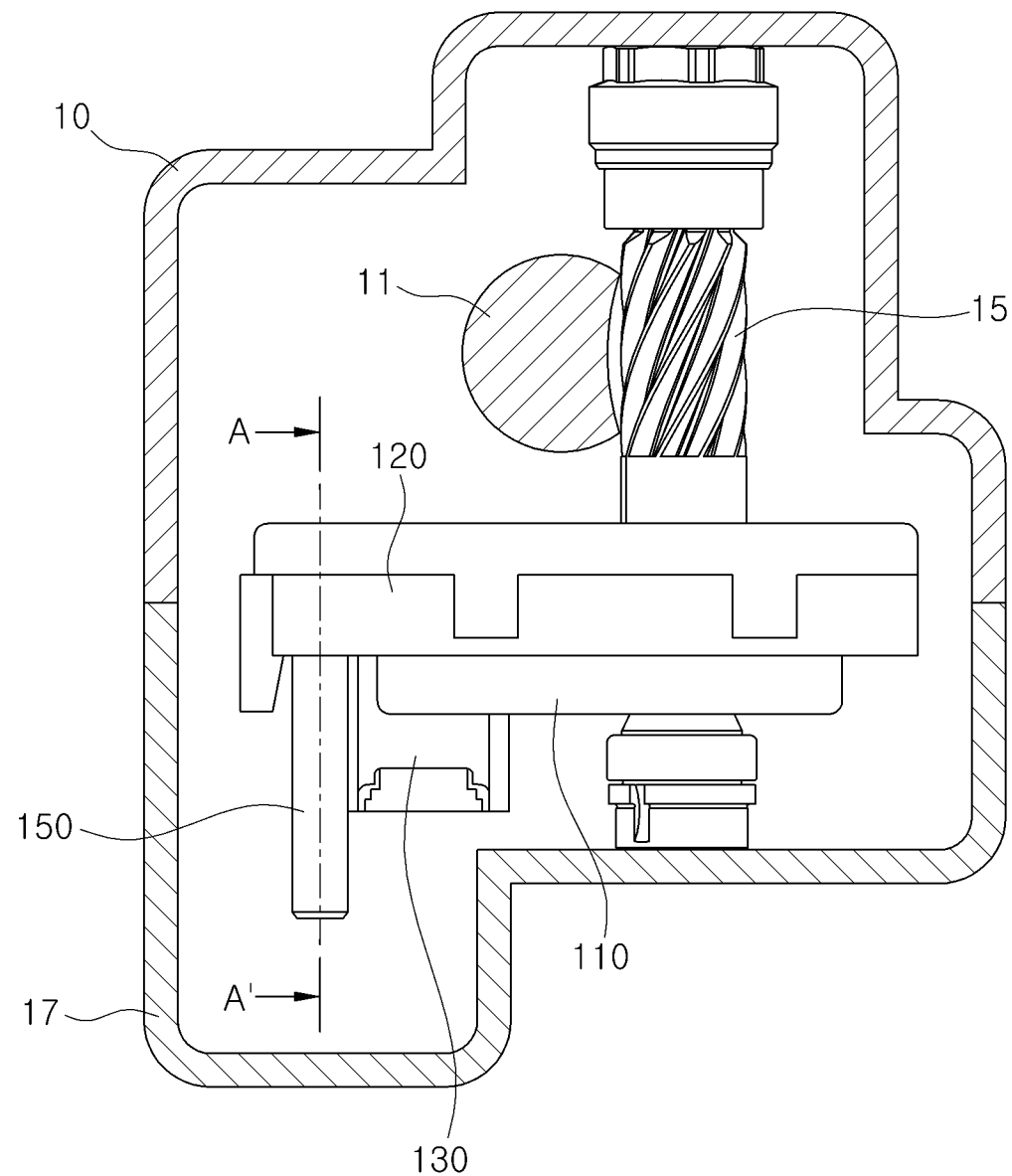
FIG. 3 is a side cross-sectional view of a steering apparatus including an angle sensor assembly according to an embodiment.

FIG. 1 is a perspective view of a steering apparatus of a vehicle. FIG. 3 is a side cross-sectional view of a steering apparatus including an angle sensor assembly according to an embodiment.

FIG. 1 illustrates a steering apparatus 1 of a vehicle, and particularly, a load wheel actuator of a steer-by-wire (SBW) type steering apparatus. Hereinafter, the steering apparatus 1 will be described as a SBW type steering apparatus but is not limited thereto and may be an electric power steering apparatus.

Referring to FIGS. 1 and 3, the steering apparatus 1 of the vehicle may include a rack bar 11 of which both ends are connected to sides of wheels, a rack housing 10 in which the rack bar 11 is accommodated and installed, and an electric actuator 20 configured to supply power when electric power is supplied thereto from power supply. In this case, the electric actuator 20 may include a motor 22, a gear assembly 23 for transmitting power supplied from the motor 22 to the rack bar 11, and a motor controller 21 for controlling an operation of the motor 22.

The motor 22 is provided to generate and provide power for steering the vehicle when electric power is supplied thereto from power supply such as a battery of the vehicle. An operation of the motor 22 may be controlled by the motor controller 21 when an operation signal is transmitted to the motor 22 by an electronic control unit (ECU) of the steering apparatus 1, and the motor 22 and the motor controller 21 may be provided together as a power pack. To this end, a motor housing accommodating the motor 22 therein and the motor controller 21 may be assembled together through a fastening member such as a bolt, a clip, or the like.

Specifically, a rear part (a left side, see FIG. 1) of the motor housing and a front part (a right side, see FIG. 1) of the motor controller 21 may be fastened with each other to form a power pack, and a rear part (a left side, see FIG. 1) of the motor controller 21 may be provided with a plurality of connectors for electrical connection to a battery of the vehicle and the ECU.

In an embodiment, the ECU and the motor controller 21 may be integrally formed.

The motor 22 may be supplied with electric power and generate rotational power. The motor 22 may be configured as a bidirectional motor 22 to facilitate a translational motion of the rack bar 11 in a width direction. Accordingly, the rack bar 11 may make the translational motion to one side when the motor 22 rotates in one direction and make the translational motion to the other side when the motor 22 rotates in the other direction so as to steer the wheels. The motor 22 may be a commonly known motor 22 that includes a rotor, a stator, and the like, and the motor housing may be provided to accommodate these components therein.

A drive shaft of the motor 22 may be exposed at a side of the gear assembly 23 provided on a front part (a right side, see FIG. 1) of the motor housing. The drive shaft may be coupled to an input shaft of the gear assembly 23, which will be described below, through a damping coupler (not shown), so that the drive shaft of the motor 22 and the input shaft of the gear assembly 23 may be operated together.

The motor housing and a gear housing of the gear assembly 23 may be assembled with and coupled to each other through a fastening member such as a bolt. An O-ring may be provided between the motor housing and the gear housing to prevent the inflow of moisture or foreign substances.

The gear assembly 23 is provided between the motor 22 and the rack bar 11 to reduce power generated by the motor 22 and transmitted the reduced power to the rack bar 11.

The gear assembly 23 may include the gear housing configured to accommodate and install components therein, the input shaft to which power is transmitted from the motor 22, a reduction gear for decelerating power transmitted to the input shaft, an output shaft for transmitting the power reduced by the reduction gear to the rack bar 11, and a sealing member provided on the input shaft and the output shaft to prevent the leakage of a lubricant and the permeation of external moisture into the reduction gear.

The rack bar 11 may extend in the form of bar in a width direction of the vehicle, and both ends thereof may be connected to a pair of wheels (not shown) through a ball joint and a tie rod 12, respectively. The rack bar 11 may be provided with a rack gear to make the translational motion in the width direction (left and right directions in FIG. 1) by rotation power transmitted from the gear assembly 23, which will be described below, and the rack gear may be engaged with a pinion gear of a pinion shaft 15 to be described below. A pair of wheels connected to both ends of the vehicle may be steered by the translational motion of the rack bar 11.

The pinion shaft 15 is engaged with the rack gear of the rack bar 11 through the pinion gear to be rotated during the translational motion of the rack bar 11. In this case, the angle sensor detects a rotation angle of the pinion shaft 15. The angle sensor is provided to detect the rotation angle of the pinion shaft 15 and transmits information about the detected rotation angle to the ECU of the steering apparatus 1 to detect the translational motion of the rack bar 11. The angle sensor may be provided in the form of an angle sensor assembly 100.

The ECU of the steering apparatus 1 may detect the translational motion of the rack bar 11 from the rotation angle of the pinion shaft 15, and operate the motor 22 of the electric actuator 20 such that the rack bar 11 may make the translational motion in response to a steering signal according to a driver's intention to steer from a steering wheel (not shown).

The rack bar 11 may be accommodated and installed inside the rack housing Specifically, the rack housing 10 may be formed to be hollow to provide an accommodation space for accommodating the rack bar 11 therein, and a pair of stretchable bellows 13 may be provided at both ends of the rack housing 10. The pair of bellows 13 may be provided to surround at least a part of both ends of the rack bar 11 and the ball joint, and include multiple corrugated parts to be easily changed in shape according to the translational motion of the rack bar 11. The pair of bellows 13 may be bound to both ends of the rack housing 10 through a steel band, and an inner space between the pair of bellows 13 may communicate with the accommodation space of the rack housing 10. The bellows 13 are provided to surround at least a part of both ends of the rack bar 11 and the ball joint to prevent foreign substances or moisture from penetrating the ball joint.

Moisture may penetrate the inside of the rack housing 10 in spite of the O-ring, the sealing member, and the bellows 13. The moisture permeating the inside of the rack housing 10 is collected at a low point 16 on the rack housing 10. Generally, the low point is formed at a lower end of the pinion shaft 15.

The angle sensor assembly 100 of the present embodiment is capable of detecting moisture penetrating the rack housing 10 to prevent a risk factor which may occur in the vehicle.

Figure 2:
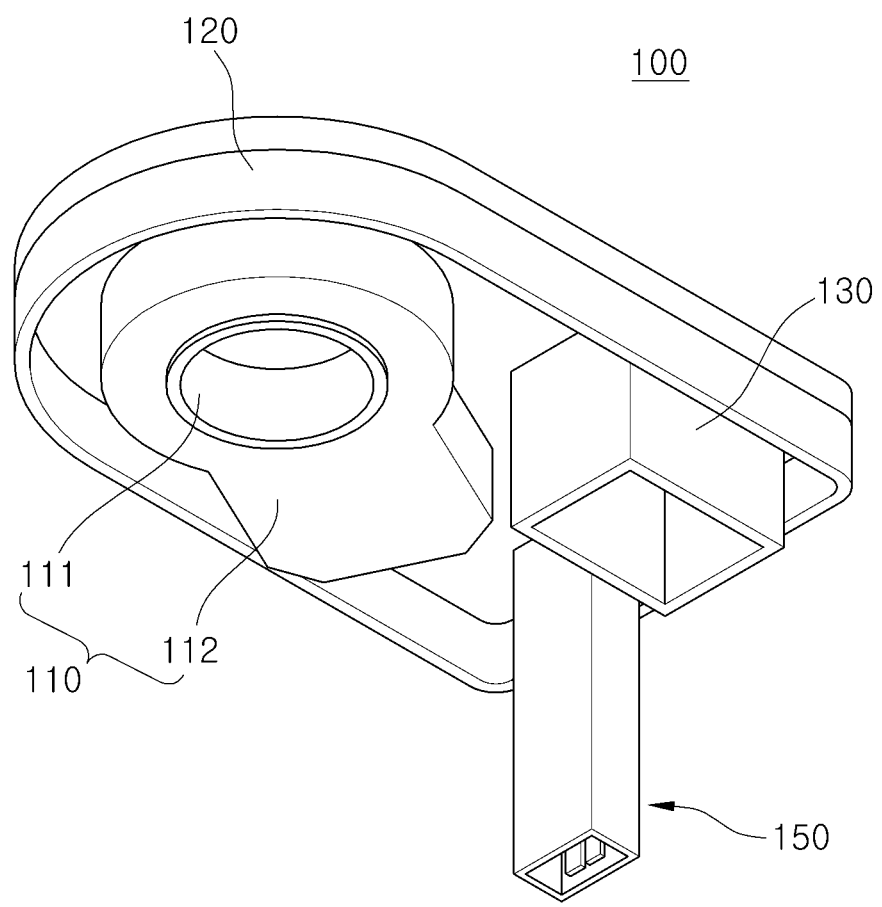
FIG. 2 is a perspective view of an angle sensor assembly according to an embodiment.
Figure 4:
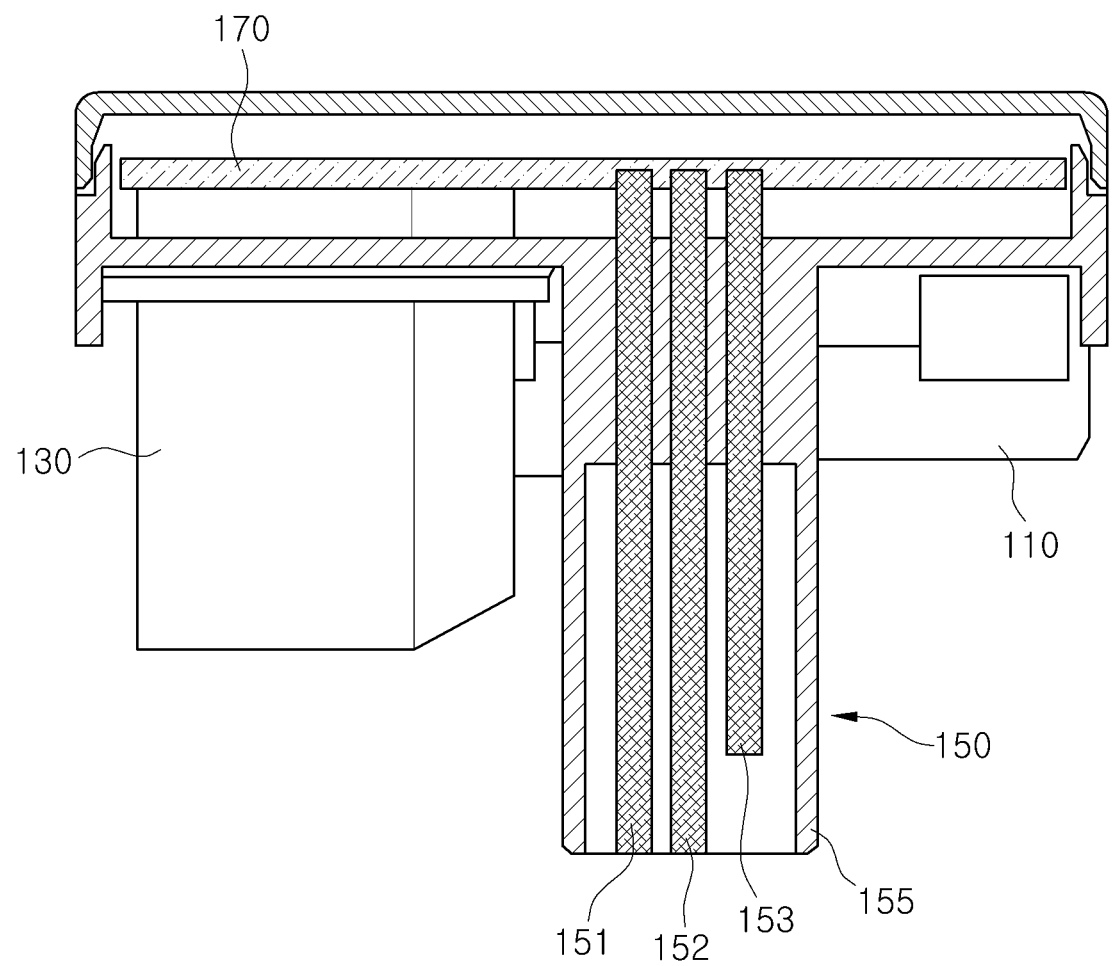
FIG. 4 is a cross-sectional view taken along line A-A' of FIG. 3.
Figure 5:
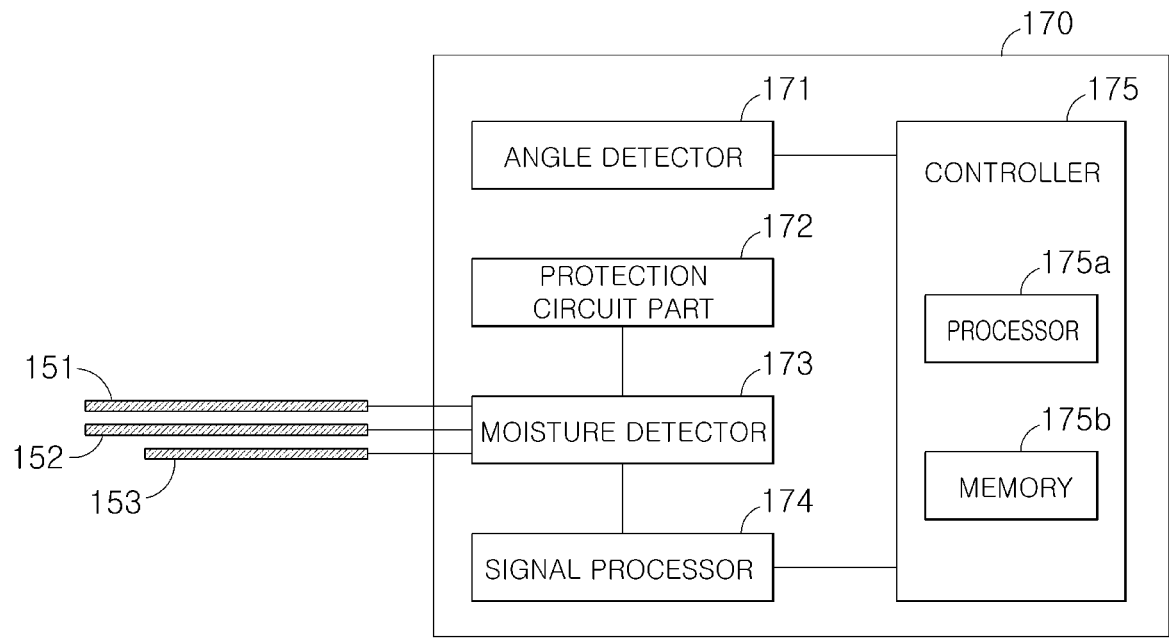
FIG. 5 is a diagram illustrating a configuration of a control circuit included in an angle sensor assembly according to an embodiment.

FIG. 2 is a perspective view of an angle sensor assembly according to an embodiment. FIG. 3 is a side cross-sectional view of a steering apparatus including an angle sensor assembly according to an embodiment. FIG. 4 is a cross-sectional view along line A-A' of FIG. 3. FIG. 5 is a diagram illustrating a configuration of a control circuit included in an angle sensor assembly according to an embodiment.

FIGS. 2 to 5 illustrate an angle sensor assembly 100 of the present embodiment. The angle sensor assembly according to the present embodiment is accommodated inside the rack housing 10 and connected to the pinion shaft 15 to detect the rotation angle of the pinion shaft 15.

The angle sensor assembly 100 according to the present embodiment includes an angle sensor 110, a moisture sensor 150, and a housing 120.

The angle sensor 110 is connected to the pinion shaft 15. The angle sensor 110 may be provided to measure the rotation angle of the pinion shaft 15 rotated due to a translational movement of the rack bar 11 when the motor 22 is driven.

The angle sensor 110 may include a rotating part 111 connected to the pinion shaft 15 and rotated together with the rotation of the pinion shaft 15, and a fixing part 112 fixed on the rack housing 10 to detect the rotation of the rotating part 111.

The angle sensor 110 may be provided to measure the rotation angle of the pinion shaft 15 and transmit a measured value to the ECU of the steering apparatus 1. The angle sensor 110 is well known in this art and thus a detailed description thereof will be omitted here.

The moisture sensor 150 may be provided to detect moisture introduced into the rack housing 10. The moisture sensor 150 may include a plurality of electrodes exposed to the outside to measure moisture.

The moisture sensor 150 may include a control unit 170. The control unit 170 may be electrically connected to the plurality of electrodes of the moisture sensor 150 to process detected signals and transmit a result of the processed detected signals to an external device.

The control unit 170 may include a circuit provided on a substrate and a plurality of electronic devices mounted on the substrate as shown in FIG. 4.

The angle sensor 110, the moisture sensor 150, and the control unit 170 are accommodated in the housing 120. The angle sensor 110, the moisture sensor 150, and the control unit 170 are accommodated and formed integrally inside the housing 120, and thus the angle sensor assembly 100 may be easily installed or disassembled inside the rack housing 10.

A connector 130 may be provided in the housing 120. The connector 130 may be electrically connected to a battery of the vehicle and external devices to be supplied with power and to transmit and receive electrical signals.

Referring to FIGS. 4 and 5, the moisture sensor 150 may include a ground electrode 151, a first input electrode 152, and a second input electrode 153.

Referring to FIG. 4, the ground electrode 151, the first input electrode 152, and the second input electrode 153 extend downward from the housing 120, and lower ends thereof are exposed to the outside of the housing 120.

Preferably, the lower ends of the ground electrode 151, the first input electrode 152, and the second input electrode 153 are arranged to be exposed to a moisture storage tank part 17 provided inside the rack housing 10 to collect moisture introduced into the rack housing 10.

The moisture storage tank part 17 is provided near the low point 16 on an inner space of the rack housing 10 so that introduced moisture may be collected in the moisture storage tank part 17 when the introduced moisture flows downward. Because the lower ends of the ground electrode 151, the first input electrode 152, and the second input electrode 153 are exposed in the moisture storage tank part 17, moisture may contact with the ground electrode 151, the first input electrode 152, and the second input electrode 153 when moisture is collected in the moisture storage tank part 17. The moisture sensor 150 may detect moisture when moisture comes into contact with these electrodes.

The moisture sensor 150 may further include an electrode protection part 155 which is provided to encompass sides of the ground electrode 151, the first input electrode 152, and the second input electrode 153, with an open lower end. The electrode protection part 155 covers the sides of the ground electrode 151, the first input electrode 152, and the second input electrode 153 to prevent damage thereto while exposing the lower ends the ground electrode 151, the first input electrode 152, and the second input electrode 153 to the outside.

A height of the lower end of the first input electrode 152 and a height of the second input electrode 153, both measured from a bottom inner surface of the moisture storage tank, are different from each other. Preferably, the height of the lower end of the first input electrode 152 is lower than the height of the lower end of the second input electrode 153. That is, the first input electrode 152 extends further downward compared to the second input electrode 153. Thus, the first input electrode 152 may detect moisture at a lower position than the second input electrode 153.

Meanwhile, a height of the lower end of the ground electrode 151 measured from the bottom inner surface of the moisture storage tank is equal to the height of the lower end of the first input electrode 152.

In this case, the lower end of the ground electrode 151 and the first input electrode 152 preferably protrude from a lowest side of the angle sensor assembly 100. When the lower ends of the ground electrode 151 and the first input electrode 152 protrude from the lowest side of the angle sensor assembly 100, the ground electrode 151 and the first input electrode 152 may detect moisture before other components of the angle sensor assembly 100 are affected by the moisture.

The control unit 170 may be integrally formed with a control unit of the angle sensor 110. The control unit 170 may be electrically connected to the angle sensor 110 to process a detected measured value and transmit the measured value to an external device.

Specifically, as shown in FIG. 5, the control unit 170 may include a controller 175, which processes data detected by the angle sensor 110 and the moisture sensor 150. Further components included in the control unit 170 for aiding the controller 175 in data processing are: an angle detector 171, a protection circuit part 172, a moisture detector 173, and a signal processor 174. In an embodiment, the angle detector 171, the protection circuit part 172, the moisture detector 173, the signal processor 174, and the controller 175 may be implemented as separate semiconductor devices or together as a single semiconductor device.

The angle detector 171 is electrically connected to the angle sensor 110 to process detected data. The angle detector 171 may receive and process detected data output from the angle sensor 110 to detect and output a rotation angle of the pinion shaft 15.

The moisture detector 173 may be electrically connected to the plurality of electrodes 151, 152, and 153 to process a measured value by these electrodes and to generate a moisture detection signal.

The protection circuit part 172 protects the control unit 170 when the control unit 170 is affected by moisture. The control unit 170 may be electrically connected to the ground electrode 151, the first input electrode 152, and the second input electrode 153 through the moisture detector 173. Because these electrodes 151, 152, 153 could be exposed outside of the housing 120, they may encounter moisture. This could potentially trigger issues such as overcurrent or overvoltage within the control unit 170 due to moisture. To prevent such complications, the protection circuit part 172 is provided, which disconnects the circuit to protect the circuit when such a problem occurs.

The moisture detector 173 obtains data detected by the ground electrode 151, the first input electrode 152, and the second input electrode 153.

The signal processor 174 may process data detected by the moisture detector 173 to generate a moisture detection signal and transmit the moisture detection signal to the controller 175. A method of generating a moisture detection signal by the moisture detector 173 and the signal processor 174 through the ground electrode 151, the first input electrode 152, and the second input electrode 153 will be described in detail below.

The controller 175 may receive information about a rotation angle from the angle detector 171 connected thereto, and receive and process a moisture detection signal from the signal processor 174.

The controller 175 may be provided to process data detected by the angle sensor 110 and the moisture sensor 150. In an embodiment, the controller 175 may process the data detected by the angle sensor 110 and the moisture sensor 150 and transmit a result of the processed data to the ECU of the steering apparatus 1.

Alternatively, in another embodiment, the controller 175 may be integrally formed with the ECU of the steering apparatus 1.

The controller 175 may include a plurality of semiconductor devices and be referred to as various terms such as an ECU. The controller 175 includes a memory 175b and a processor 175a. The memory 175b and the processor 175a may be implemented as separate semiconductor devices or a single semiconductor device. The controller 175 may include a plurality of processors and/or a plurality of memories.

The memory 175b may memorize/store a program and data for detecting moisture through the moisture detector 173 and the signal processor 174. For example, the memory 175b may memorize/store a program and data for detecting and processing a voltage between the ground electrode 151 and the first input electrode 152 of the moisture sensor 150 to determine whether moisture is detected, generating a first water level detection signal, and transmitting the first water level detection signal to an external device. In addition, the memory 175b may memorize/storage a reference voltage that is a criterion for determining whether moisture is detected.

The memory 175b may provide the program and the data to the processor 175a and may store temporary data generated during a computational operation of the processor 175a.

Examples of the memory 175b may include a volatile memory such as a static random access memory (S-RAM) or a dynamic random access memory (DRAM) and a nonvolatile memory such as a read-only memory (ROM), an erasable programmable read-only memory (EPROM) or a flash memory. The memory 175b may include one semiconductor device or a plurality of semiconductor devices.

The processor 175a may generate a moisture detection signal through the moisture detector 173 and the signal processor 174 according to the program and data provided from the memory 175b, and transmit the generated moisture detection signal to an external device. For example, the processor 175a may provide the moisture detection signal to the ECU of the steering apparatus 1 to prevent abnormality from occurring in a steering function, and provide the moisture detection signal to a body control module (BCM) of the vehicle to display a notification regarding detected moisture or warn a driver or a driver of another vehicle of the occurrence of abnormality in the vehicle.

The processor 175a may include an arithmetic circuit, a storage circuit, and a control circuit. The processor 175a may include one semiconductor device or a plurality of semiconductors. The processor 175a may include one core or multiple cores inside one semiconductor device. The processor 175a may be referred to as various terms such as a micro-processing unit (MPU).

As described above, the controller 175 may generate a moisture detection signal based on information provided from the ground electrode 151, the first input electrode 152, and the second input electrode 153 connected thereto. In addition, the controller 175 may transmit a communication message to transmit the generated moisture detection signal to external devices.

A moisture detection operation performed by the control unit 170 of the angle sensor assembly 100 will be described below.

Figure 6:
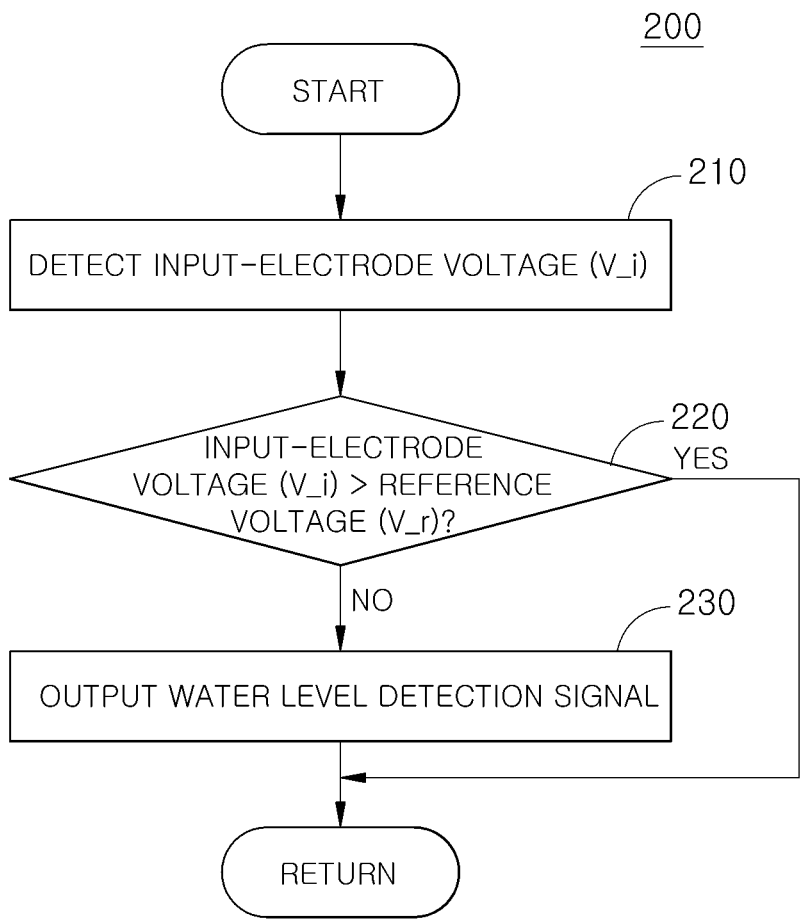
FIG. 6 is a diagram illustrating a moisture detection operation of an angle sensor assembly according to an embodiment.

FIG. 6 is a diagram illustrating a moisture detection operation of an angle sensor assembly according to an embodiment.

As described above, the angle sensor assembly 100 according to the present embodiment includes the ground electrode 151, the first input electrode 152, and the second input electrode 153 which extend downward from the housing 120, with their lower ends being exposed outside of the housing 120.

The control unit 170 may detect moisture based on electrical conductivities of the ground electrode 151, the first input electrode 152, and the second input electrode 153 that are exposed to the outside. For example, the moisture detector 173 measures electrical conductivity through voltages or currents of the ground electrode 151, the first input electrode 152, and the second input electrode 153 to generate an electrical signal, and the signal processor processes the generated electrical signal by offset, amplification, linearization, etc. to determine whether moisture is detected.

Referring to FIG. 6, in a moisture detection method 200 performed by the control unit 170 of the angle sensor assembly 100 according to the present embodiment, the control unit 170 detects an input-electrode voltage $V\_i$ between the ground electrode 151 and the input electrodes 152 and 153 (210). The control unit 170 may output a water level detection signal based on the input-electrode voltage $V\_i$. The control unit 170 may detect a change in a voltage between the ground electrode 151 and the input electrodes 152 and 153 and output a water level detection signal when moisture exists between the lower ends of the ground electrode 151 and the input electrodes 152 and 153.

Specifically, the control unit 170 may compare the input-electrode voltage V_i with a reference voltage V_r (220), and output a water level detection signal (230). The water level detection signal may not be output when comparing the input-electrode voltage V_i with the reference voltage V_r (220) reveals that the input-electrode voltage V_i is higher than the reference voltage V_r (yes from 220), and may be output, at step 230, when the comparing reveals that the input-electrode voltage V_i is either equal to or lower than the reference voltage V_r (no from 220). When moisture exists between the lower ends of the ground electrode 151 and the input electrodes 152 and 153, which are exposed externally, it can create an electrical connection between these electrodes. This condition may decrease the voltage. Consequently, the control unit 170 may detect the presence of moisture by comparing the input-electrode voltage V_i with the reference voltage V_r.

Although FIG. 6 illustrates the embodiment in which the control unit 170 detects the input-electrode voltage V_i between the ground electrode 151 and the input electrodes 152 and 153 to detect moisture, in another embodiment, the control unit 170 may detect an input-electrode current I_i between the ground electrode 151 and the input electrodes 152 and 153 to detect moisture.

Specifically, the control unit 170 may detect the input-electrode current I_i between the ground electrode 151 and the input electrodes 152 and 153, and output a water level detection signal based on the input-electrode current I_i. In this case, the control unit 170 may store a reference current I_r to determine whether to output the water level detection signal.

Figure 7:
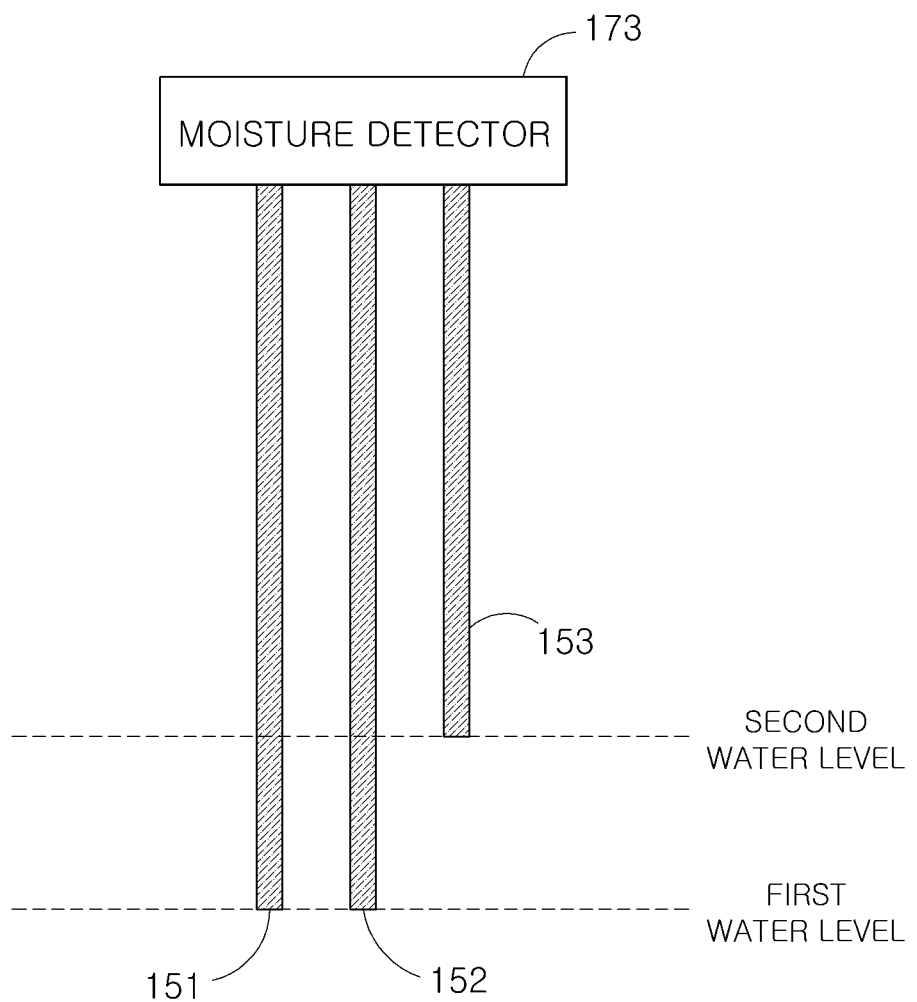
FIG. 7 is a diagram illustrating an arrangement of electrodes of an angle sensor assembly according to an embodiment.

FIG. 7 is a diagram illustrating an arrangement of electrodes of an angle sensor assembly according to an embodiment.

As shown in FIG. 7, the moisture sensor 150 includes one ground electrode 151 and a plurality of input electrodes 152 and 153. In this case, a height of the lower end of the first input electrode 152 and a height of the lower end of the second input electrode 153, both measured from a bottom inner surface of a moisture storage tank of the rack housing, are different from each other. Preferably, the height of the lower end of the first input electrode 152 is lower than the height of the lower end of the second input electrode 153.

A height of the lower end of the ground electrode measured from the bottom inner surface of the moisture storage tank is equal to the height of the lower end of the first input electrode.

Because the heights of the lower ends of the two input electrodes 152 and 153 are different from each other, the two input electrodes 152 and 153 may detect moisture at different heights.

As shown in FIG. 7, when a level of moisture in the rack housing 10 reaches a first water level, the first input electrode 152 may come into contact with the moisture and thus detect the moisture. In this case, the second input electrode 153 does not come into contact with the moisture and thus cannot detect the moisture.

Meanwhile, when the level of moisture in the rack housing 10 reaches a second water level, the second input electrode 153 may come into contact with the moisture and thus detect the moisture. In this case, the first input electrode 152 may also come into contact with the moisture and thus detect the moisture.

That is, the control unit 170 may generate a moisture detection signal according to a waver level by independently sensing moisture through the first input electrode 152 and the second input electrode 153.

Figure 8:
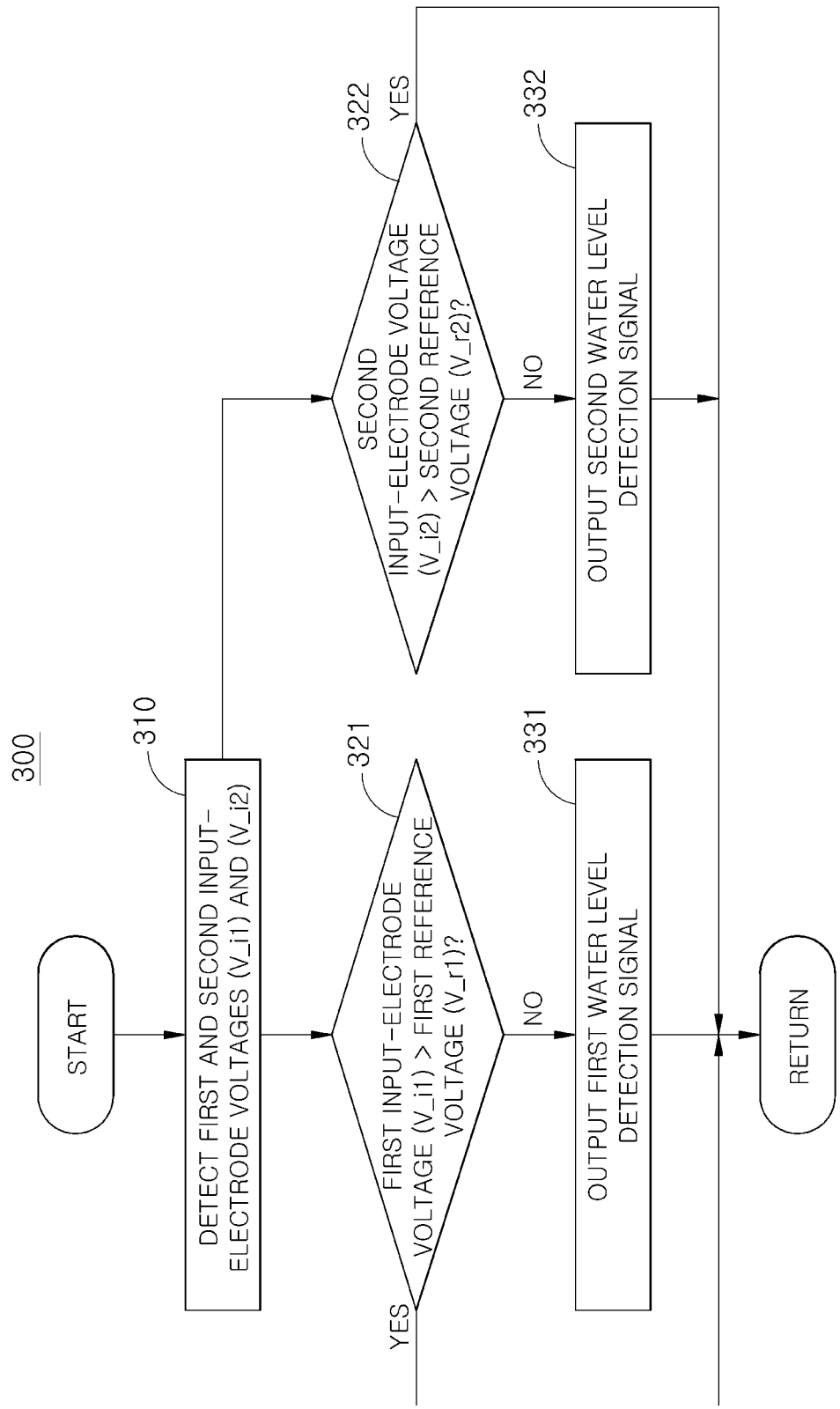
FIG. 8 is a diagram illustrating an example of a moisture detection operation of an angle sensor assembly according to an embodiment.
Figure 9:
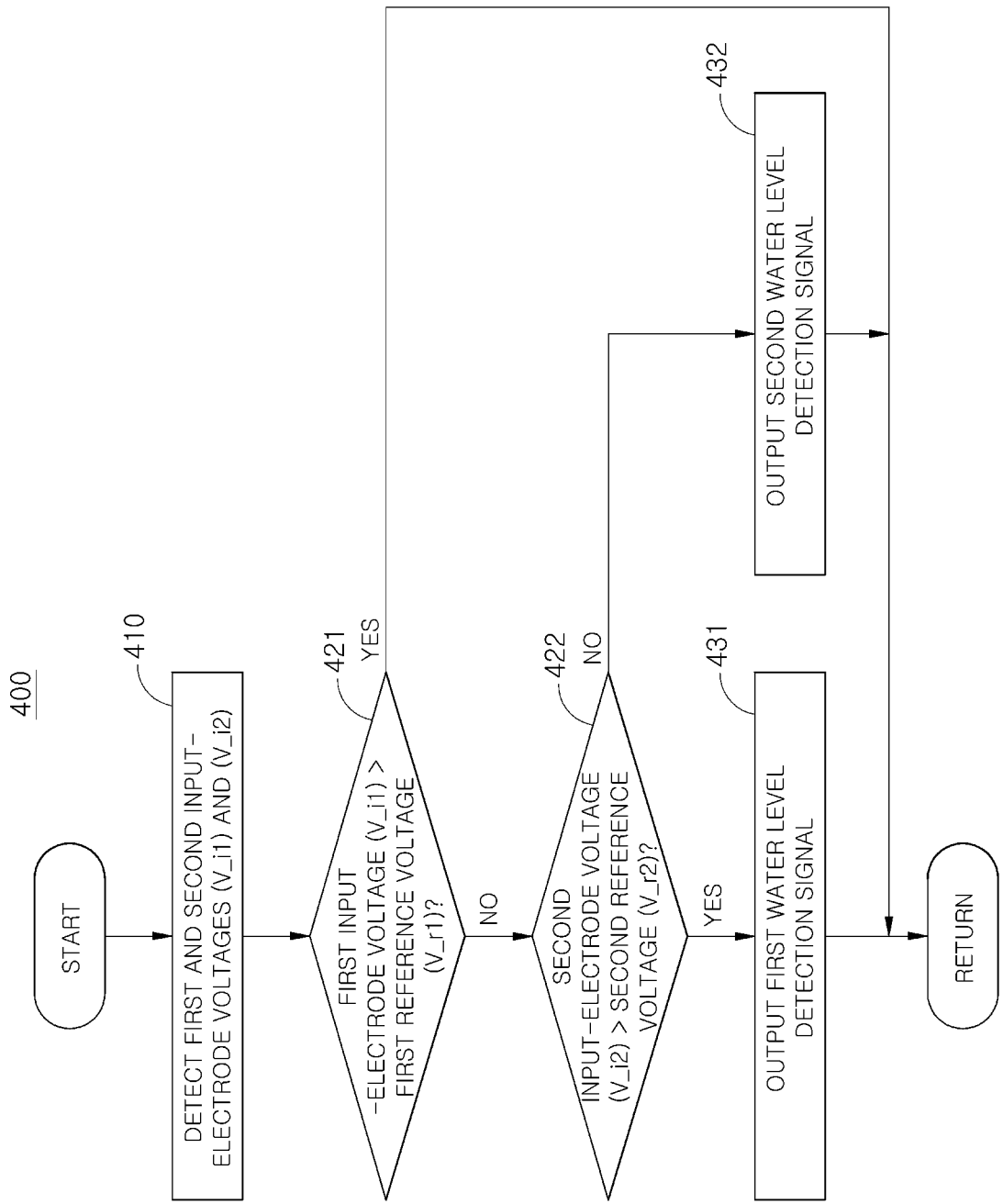
FIG. 9 is a diagram illustrating an example of a moisture detection operation of an angle sensor assembly according to an embodiment.

FIGS. 8 and 9 illustrate moisture detection methods 300 and 400 of detecting moisture through the first input electrode 152 and the second input electrode 153.

FIG. 8 is a diagram illustrating an example of a moisture detection operation of an angle sensor assembly according to an embodiment.

Referring to FIG. 8, the control unit 170 detects a first input-electrode voltage V_i1 between the ground electrode 151 and the first input electrode 152 and detects a second input-electrode voltage V_i2 between the ground electrode 151 and the second input electrode 153 (310). In the present disclosure, the ground electrode 151 is commonly used for the detection of the first input-electrode voltage V_i1 and the second input-electrode voltage V_i2, the number of electrodes of the moisture sensor 150 may be reduced and the size of the moisture sensor 150 may be minimized. The control unit 170 may output a water level detection signal based on the first input-electrode voltage V_i1 and the second input-electrode voltage V_i2.

Specifically, the control unit 170 may compare the first input-electrode voltage V_i1 with a first reference voltage V_r1 (321), and output a first water level detection signal (331). The first reference voltage V_r1 may be predetermined. The control unit 170 may compare the first input-electrode voltage V_i1 with the first reference voltage V_r1 (321), and may not output a water level detection signal when the first input-electrode voltage V_i1 is higher than the first reference voltage V_r1 (yes from 321) and may output the first water level detection signal, at step 331, when the first input electrode voltage V_i1 is either equal to or lower than the first reference voltage V_r1 (no from 321).

Meanwhile, the control unit 170 may compare the second input-electrode voltage V_i2 with a second reference voltage V_r2 (322), and output a second water level detection signal (332). The second reference voltage V_r2 may be predetermined. The control unit 170 may compare the second input-electrode voltage V_i2 with the second reference voltage V_r2 (322), and may not output a water level detection signal when the second input-electrode voltage V_i2 is higher than the second reference voltage V_r2 (yes from 322) and may output the second water level detection signal, at step 332, when the second input electrode voltage V_i2 is either equal to or lower than the second reference voltage V_r2 (no from 322).

In this case, the second reference voltage V_r2 and the first reference voltage V_r1 may be different values.

As described above, in another embodiment of the present disclosure, the control unit 170 may detect moisture by detecting a first input-electrode current I_i1 between the ground electrode 151 and the first input electrode 152 and a second input-electrode current I_i2 between the ground electrode 151 and the second input electrode 153.

Specifically, the control unit 170 may detect the first input-electrode current I_i1 between the ground electrode 151 and the first input electrode 152, detect the second input-electrode current I_i2 between the ground electrode 151 and the second input electrode 153, output a first water level signal in response to the first input-electrode current I_i1, and output a second water level signal in response to the second input electrode current I_i2. In this case, the control unit 170 may store a first reference current I_r1 and a second reference current I_r2 to determine whether to output a water level detection signal. The first reference current I_r1 and the second reference current I_r2 may be predetermined.

FIG. 9 is a diagram illustrating an example of a moisture detection operation of an angle sensor assembly according to an embodiment.

In the moisture detection method 400 of the embodiment shown in FIG. 9, the control unit 170 detects the first input-electrode voltage V_i1 between the ground electrode 151 and the first input electrode 152 and the second input electrode voltage V_i2 between the ground electrode 151 and the second input electrode 153 (410). The control unit 170 may output a water level detection signal based on the first input-electrode voltage V_i1 and the second input-electrode voltage V_i2.

Specifically, the control unit 170 compares the first input-electrode voltage V_i1 with the first reference voltage V_r1 (421), and does not output the water level detection signal when the first input-electrode voltage V_i1 is higher than the first reference voltage V_r1 (yes from 421). In this case, because the first water level, which is lower than the second water level shown in FIG. 7, is not reached, there is no need to make a decision for the second input-electrode voltage V_i2.

Meanwhile, when the first input-electrode voltage V_i1 is either equal to or lower than the first reference voltage V_r1 (no from 421), the control unit 170 compares the second input electrode voltage V_i2 with the second reference voltage V_r2 (422). Then, the control unit 170 outputs a first water level detection signal, at step 431, when the second input electrode voltage V_i2 is higher than second reference voltage V_r2 (yes from 422). In other words, the control unit 170 outputs the first water level detection signal upon determining that the first water level is reached, as evidenced by the first input electrode voltage V_i1 being equal to or lower than the first reference voltage V_r1 (no from 421), and the second water level is not reached, as evidenced by the second input electrode voltage V_i2 being higher than the second reference voltage V_r2 (yes from 422).

Meanwhile, when the second input-electrode voltage V_i2 is equal to or lower than the second reference voltage V_r2 (no from 422), the control unit 170 may output a second water level detection signal (432). That is, the control unit 170 outputs the second water level detection signal, at step 432, upon determining that the second water level is reached, as evidenced by the second input-electrode voltage V_i2 being equal to or lower than the second reference voltage V_r2 (no from 422).

As described above, in the embodiment of FIG. 9, the control unit 170 may sequentially output water level detection signals without independently making decisions for the first input-electrode voltage V_i1 and the second input-electrode voltage V_i2, unlike in the embodiment of FIG. 8.

Figure 10:
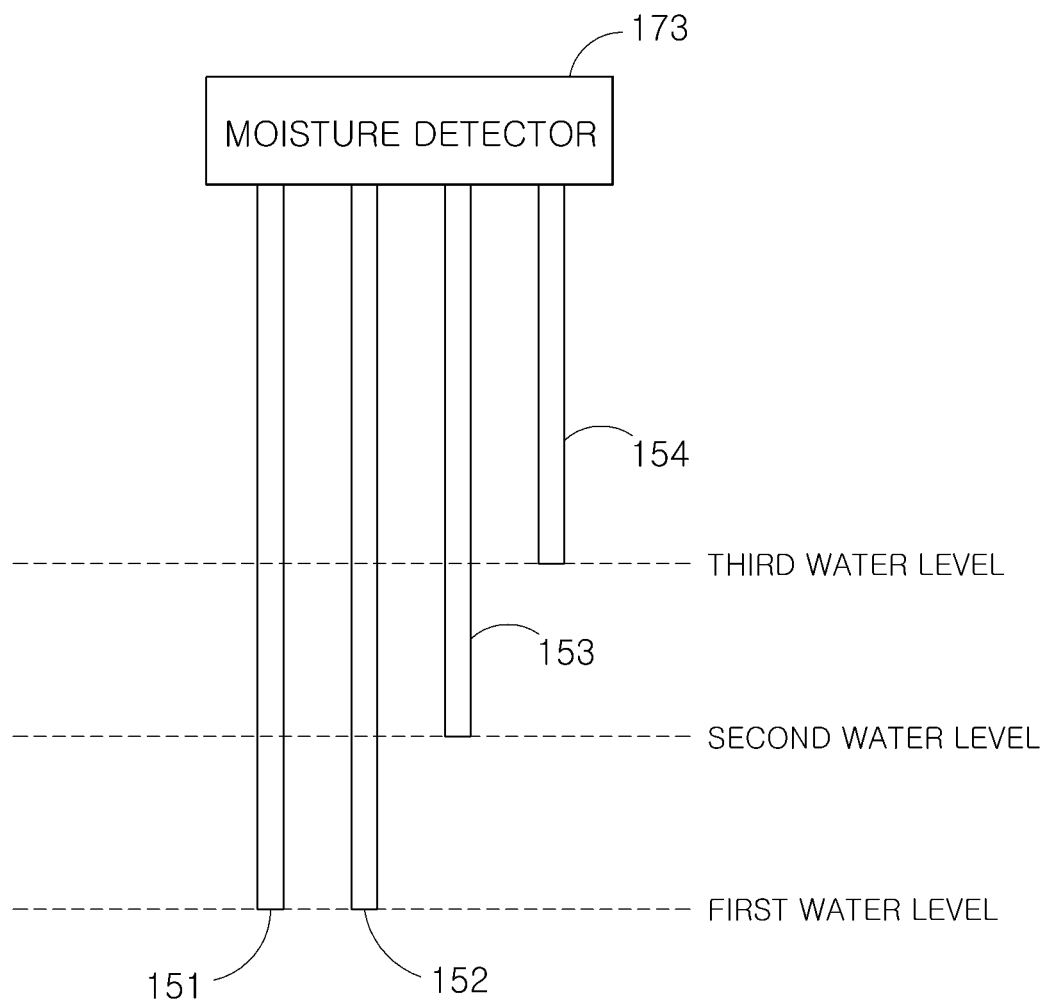
FIG. 10 is a diagram illustrating an example of an arrangement of electrodes of an angle sensor assembly according to an embodiment.

FIG. 10 is a diagram illustrating an example of an arrangement of electrodes of an angle sensor assembly according to an embodiment.

FIG. 10 illustrates an example of a moisture sensor 150 including three input electrodes 152, 153, and 154. The moisture sensor 150 further includes the third input electrode 154, compared to the embodiment of FIG. 7. The ground electrode 151, the first input electrode 152, and the second input electrode 153 are the same as those of the embodiment illustrated in FIG. 7 and thus a description thereof will be omitted.

The third input electrode 154 extend downward from a housing 120 and a lower end thereof is exposed to the outside of the housing 120, similar to the first input electrode 152 and the second input electrode 153.

In this case, heights of the lower ends of the first input electrode 152, the second input electrode 153, and the third input electrode 154 in relation to the bottom inner surface of the moisture storage tank are different from one another.

Preferably, the height of the lower end of the first input electrode 152 is lower than the height of the lower end of the second input electrode 153, and the height of the lower end of the second input electrode 153 is lower than the height of the lower end of the third input electrode 154.

The height of the lower end of the ground electrode 151 in relation to the bottom inner surface of the moisture storage tank is equal to the height of the lower end of the first input electrode 152.

Because the heights of the lower ends of the three input electrodes 152, 153 and 154 are different from one another, the three input electrodes 152, 153 and 154 may detect moisture at different heights.

As shown in FIG. 10, when a level of moisture in the rack housing 10 reaches a first water level, the first input electrode 152 may come into contact with the moisture and thus detect the moisture. In this case, the second input electrode 153 and the third input electrode 154 do not come into contact with the moisture and thus cannot detect the moisture.

Meanwhile, when the level of moisture in the rack housing 10 reaches a second water level, the second input electrode 153 may come into contact with the moisture and thus detect the moisture. In this case, the first input electrode 152 also comes into contact with the moisture and thus may detect the moisture, and the third input electrode 154 does not come into contact with the moisture and thus cannot detect the moisture.

Meanwhile, when the level of moisture in the rack housing 10 reaches a third water level, the third input electrode 154 may come into contact with the moisture and thus detect the moisture. In this case, the first input electrode 152 and the second input electrode 153 also come into contact with the moisture and thus may detect the moisture.

That is, the control unit 170 may generate a moisture detection signal according to a waver level by independently sensing moisture through the first input electrode 152, the second input electrode 153, and the third input electrode 154.

As is apparent from the above description, an angle sensor assembly according to an embodiment of the present disclosure is capable of informing a driver of a risk factor due to the introduction of moisture in advance by turning on a warning light on a dashboard or by sound, or controlling the operation of vehicle's steering including the steering feedback actuator.

An angle sensor assembly according to an embodiment of the present disclosure can be configured as an integrated package including a mechanism structure and electronic devices by adding additional components to an existing angle sensor assembly, thereby optimizing system size.

An angle sensor assembly according to an embodiment of the present disclosure is capable of detecting introduced moisture using two or more input electrodes and detecting an increase in a level of the moisture when the level of the moisture increases.

An angle sensor assembly according to an embodiment of the present disclosure is capable of quickly detecting moisture by detecting moisture in a water tank part provided to collect moisture introduced into a steering apparatus.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A sensor assembly comprising:
   a housing;
   an angle sensor provided in the housing; and
   a moisture sensor provided in the housing,
   wherein the moisture sensor comprises a ground electrode, a first input electrode, a second input electrode, and a control unit electrically connected to the ground electrode, the first input electrode, and the second input electrode to detect moisture,
   the ground electrode, the first input electrode, and the second input electrode extend downward from the housing,
   a lower end of the ground electrode, a lower end of the first input electrode, and a lower end of the second input electrode are exposed to an outside of the housing, and
   the first input electrode extends downward to a different level compared to the second input electrode.

2. The sensor assembly according to claim 1, wherein the first input electrode extends further downward compared to the second input electrode.

3. The sensor assembly according to claim 2, wherein the ground electrode extends downward to a same level as the first input electrode.

4. The sensor assembly according to claim 1, wherein the control unit is further configured to:
   detect a first input-electrode voltage between the ground electrode and the first input electrode;
   detect a second input-electrode voltage between the ground electrode and the second input electrode; and
   output a water level detection signal based on the first input-electrode voltage and the second input-electrode voltage.

5. The sensor assembly according to claim 4, wherein the control unit is configured to:
   compare the first input-electrode voltage with a first reference voltage and
   output a first water level detection signal.

6. The sensor assembly according to claim 4, wherein the control unit is configured to:
   compare the second input-electrode voltage with a second reference voltage and
   output a second water level detection signal.

7. The sensor assembly according to claim 1, wherein the control unit is further configured to:
   detect a first input-electrode current between the ground electrode and the first input electrode;
   detect a second input-electrode current between the ground electrode and the second input electrode; and
   output a water level detection signal based on the first input-electrode current and the second input-electrode current.

8. The sensor assembly according to claim 1, wherein the moisture sensor further comprises a third input electrode,
   wherein the third input electrode extends downward from the housing,
   a lower end of the third input electrode is exposed to the outside of the housing, and
   the first input electrode, the second input electrode, and the third input electrode extend downward to varying levels, distinct from one another.

9. The sensor assembly according to claim 1, wherein the moisture sensor further comprises a third input electrode,
   the first input electrode extends further downward compared to the second input electrode, and
   the second input electrode extends further downward compared to the third input electrode.

10. The sensor assembly according to claim 1, wherein the moisture sensor further comprises an electrode protection part which is configured to encompass sides of the ground electrode, the first input electrode, and the second input electrode, with an open lower end.

11. An apparatus comprising:
    a pinion shaft coupled to a rack housing in which a rack bar is installed and provided with a pinion gear engaged with a rack gear; and
    a sensor assembly accommodated in the rack housing and coupled to the pinion shaft to detect a rotation angle of the pinion shaft,
    wherein the sensor assembly comprises a housing, an angle sensor provided in the housing, and a moisture sensor provided in the housing,
    the moisture sensor comprises a ground electrode, a first input electrode, a second input electrode, and a control unit electrically connected to the ground electrode, the first input electrode, and the second input electrode to detect moisture, the ground electrode, the first input electrode, and the second input electrode extend downward from the housing, a lower end of the ground electrode, a lower end of the first input electrode, and a lower end of the second input electrode are exposed to an outside of the housing, and a height of the lower end of the first input electrode and a height of the lower end of the second input electrode, both measured from a bottom inner surface of a moisture storage tank of the rack housing, are different from each other.

12. The apparatus according to claim 11, wherein the height of the lower end of the first input electrode is lower than the height of the lower end of the second input electrode.

13. The apparatus according to claim 12, wherein a height of the lower end of the ground electrode measured from the bottom inner surface of the moisture storage tank of the rack housing is equal to the height of the lower end of the first input electrode.

14. The apparatus according to claim 11, wherein the control unit is further configured to:
 detect a first input-electrode voltage between the ground electrode and the first input electrode;
 detect a second input-electrode voltage between the ground electrode and the second input electrode; and
 output a water level detection signal based on the first input-electrode voltage and the second input-electrode voltage.

15. The apparatus according to claim 14, wherein the control unit is configured to:
 compare the first input-electrode voltage with a first reference voltage and
 output a first water level detection signal.

16. The apparatus according to claim 14, wherein the control unit is configured to:
 compare the second input-electrode voltage with a second reference voltage and
 output a second water level detection signal.

17. The apparatus according to claim 11, wherein the lower end of the ground electrode, the lower end of the first input electrode, and the lower end of the second input electrode are arranged to be exposed in the water storage tank to collect moisture introduced into the rack housing.

18. A moisture detecting method performed by a sensor assembly comprising a housing, an angle sensor provided in the housing, and a moisture sensor provided in the housing, wherein the moisture sensor comprises a ground electrode, a first input electrode, a second input electrode, and a control unit, wherein the control unit is connected to the ground electrode, the first input electrode, and the second input electrode to detect the moisture, wherein the ground electrode, the first input electrode, and the second input electrode extend downward from the housing, wherein a lower end of the ground electrode, a lower end of the first input electrode, and a lower end of the second input electrode are exposed to an outside of the housing, and wherein the first input electrode extends downward to a different level compared to the second inpot electrode, the moisture detecting method comprising:
 detecting a first input-electrode voltage between the ground electrode and the first input electrode;
 detecting a second input-electrode voltage between the ground electrode and the second input electrode; and
 outputting a water level detection signal based on the first input-electrode voltage and the second input-electrode voltage.

19. The moisture detecting method according to claim 18, wherein the outputting of the water level detection signal comprises outputting a first water level detection signal by comparing the first input-electrode voltage with a first reference voltage.

20. The moisture detecting method according to claim 18, wherein the outputting of the water level detection signal comprises outputting a second water level detection signal by comparing the second input-electrode voltage with a second reference voltage.

* * * * *